(12) United States Patent
Ünlü et al.

(10) Patent No.: US 12,392,721 B2
(45) Date of Patent: Aug. 19, 2025

(54) PIXEL-DIVERSITY NANOPARTICLE DETECTION BY INTERFEROMETRIC REFLECTANCE IMAGING SENSOR

(71) Applicant: Trustees of Boston University, Boston, MA (US)

(72) Inventors: M. Selim Ünlü, Newton, MA (US); Iris Celebi, Allston, MA (US); Mete Aslan, Brighton, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/544,361

(22) Filed: Dec. 18, 2023

(65) Prior Publication Data
US 2024/0201084 A1 Jun. 20, 2024

Related U.S. Application Data

(60) Provisional application No. 63/476,042, filed on Dec. 19, 2022.

(51) Int. Cl.
*G01N 21/45* (2006.01)
*G01B 9/02* (2022.01)
(Continued)

(52) U.S. Cl.
CPC ......... *G01N 21/45* (2013.01); *G01B 9/02011* (2013.01); *G01B 9/02041* (2013.01);
(Continued)

(58) Field of Classification Search
CPC ............ G01B 9/02011; G01B 9/02041; G01N 21/21; G01N 21/45; G01N 21/55;
(Continued)

(56) References Cited

U.S. PATENT DOCUMENTS 11,428,626 B2 8/2022 Ünlü et al.
2011/0255303 A1 10/2011 Nichol et al.
(Continued)

FOREIGN PATENT DOCUMENTS

WO 2021118982 A1 6/2021
WO 2024/137530 A1 6/2024

OTHER PUBLICATIONS

Ronneberger, Olaf, et al., "U-Net: Convolutional Networks for Biomedical Image Segmentation," arXiv:1505.04597v1 [cs.CV], online http://lmb.informatik.uni-freiburg.de/, pp. 1-8, (May 18, 2015).
(Continued)

*Primary Examiner* — Dominic J Bologna
(74) *Attorney, Agent, or Firm* — Hamilton, Brook, Smith & Reynolds, P.C.

(57) ABSTRACT

Aspects of inventive concepts described herein relate to an interferometric reflectance imaging system. The system can include an imaging sensor including pixels that are preferentially sensitive to a plurality of light components; an illumination source configured to emit illumination light along an illumination path, the illumination light including the plurality of light components; and a target including a target substrate configured to support one or more nanoparticles on a surface of the target substrate. The system may be configured to, at a nominal focus position: generate an image at the imaging sensor based, at least in part, on the light reflected from the target interfering with light scattered from nanoparticles on the target substrate; and process the image to detect the nanoparticles on the target substrate.

29 Claims, 16 Drawing Sheets

(51) Int. Cl.
*G01B 9/02001* (2022.01)
*G01N 21/21* (2006.01)
*G01N 21/55* (2014.01)

(52) U.S. Cl.
CPC .............. *G01N 21/21* (2013.01); *G01N 21/55* (2013.01); *G01N 2201/06153* (2013.01)

(58) Field of Classification Search
CPC .......... G01N 2201/06153; G01J 3/2823; G01J 3/0294; G01J 2003/2826; G01J 3/45
See application file for complete search history.

(56) References Cited

U.S. PATENT DOCUMENTS

| | | | |
|---|---|---|---|
| 2012/0242826 A1* | 9/2012 | Holmes | A61B 1/0638 |
| | | | 348/E9.003 |
| 2016/0335943 A1* | 11/2016 | Ji | G09G 3/2074 |
| 2017/0016821 A1 | 1/2017 | Unlu et al. | |
| 2019/0086416 A1* | 3/2019 | Daaboul | G01N 33/57438 |
| 2020/0150028 A1* | 5/2020 | Ünlü | G01N 21/21 |
| 2021/0231563 A1 | 7/2021 | Ünlü et al. | |
| 2022/0222464 A1 | 7/2022 | Diedrich et al. | |
| 2023/0098439 A1* | 3/2023 | Darwin | G01B 9/02043 |
| | | | 356/369 |

OTHER PUBLICATIONS

International Search Report and Written Opinion for International Application No. PCT/US23/84672, entitled "Pixel-Diversity Nanoparticle Detection by Interferometric Reflectance Imaging Sensor," mailed Apr. 24, 2024.

\* cited by examiner

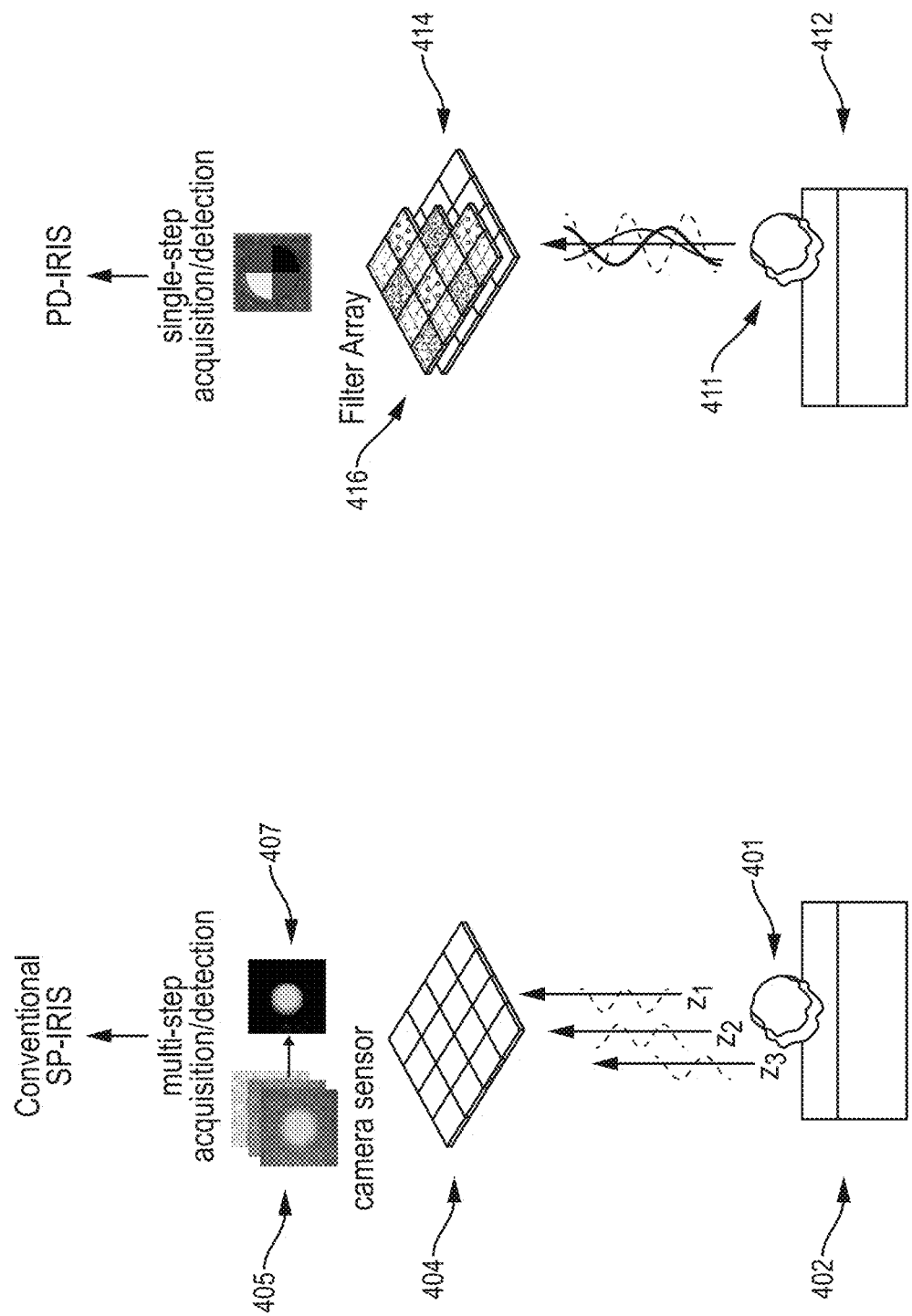

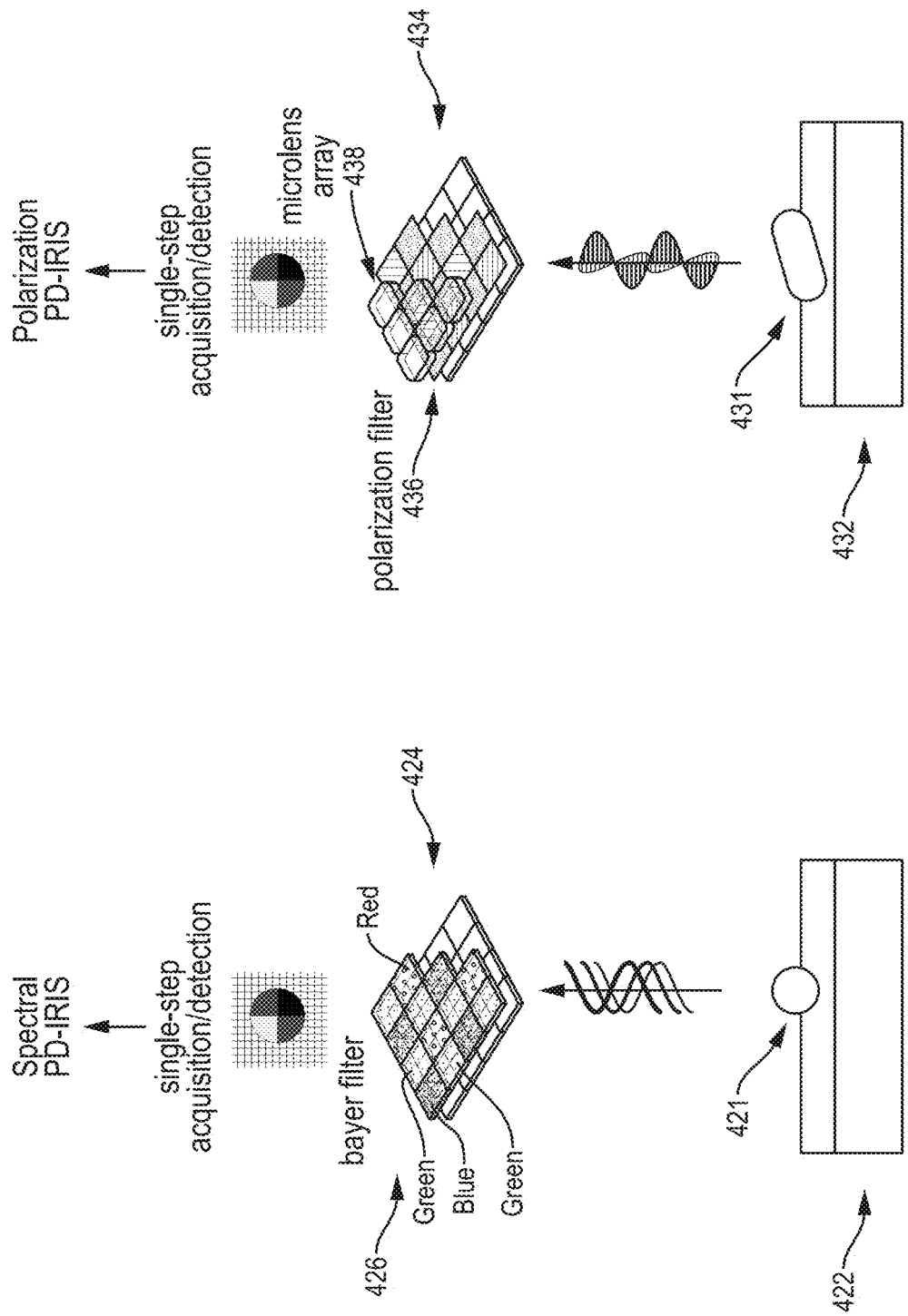

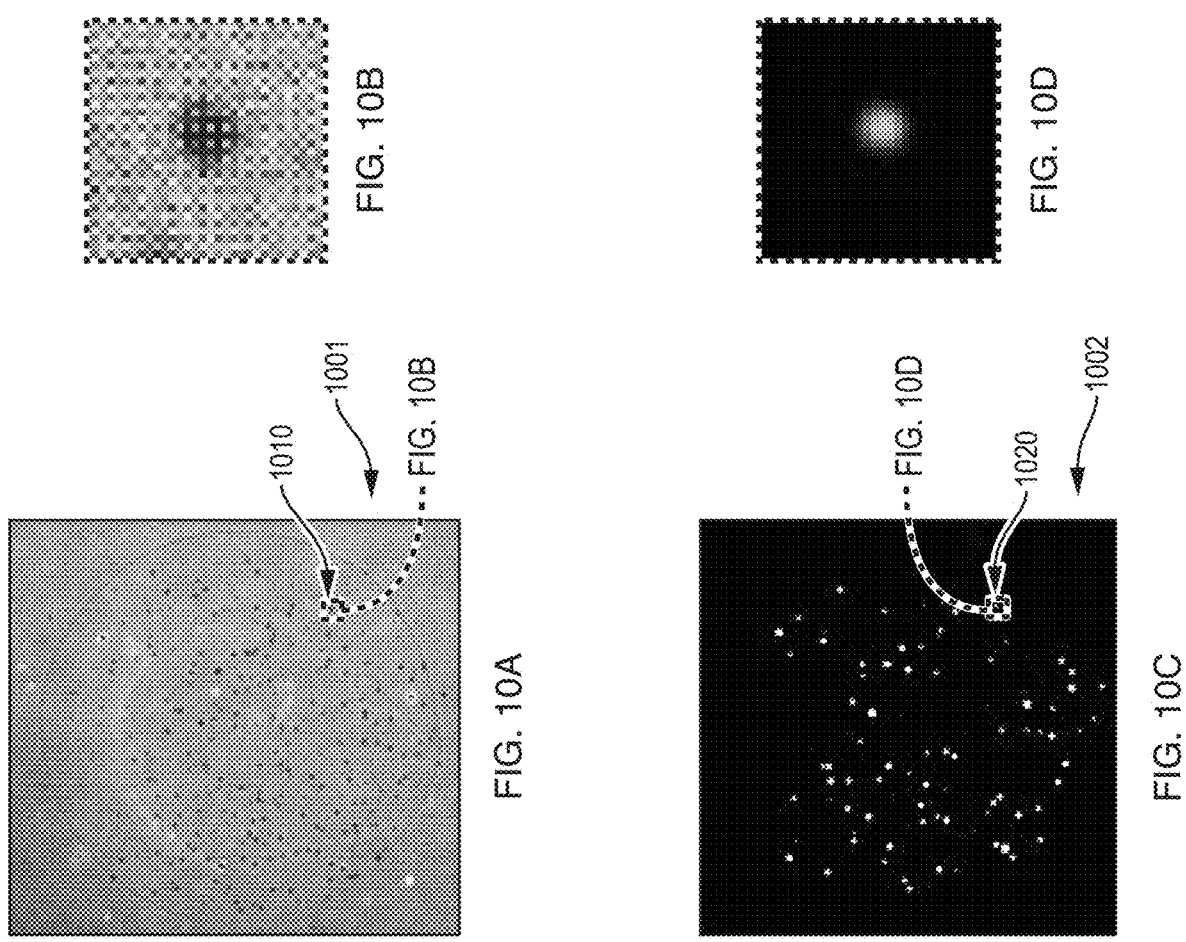

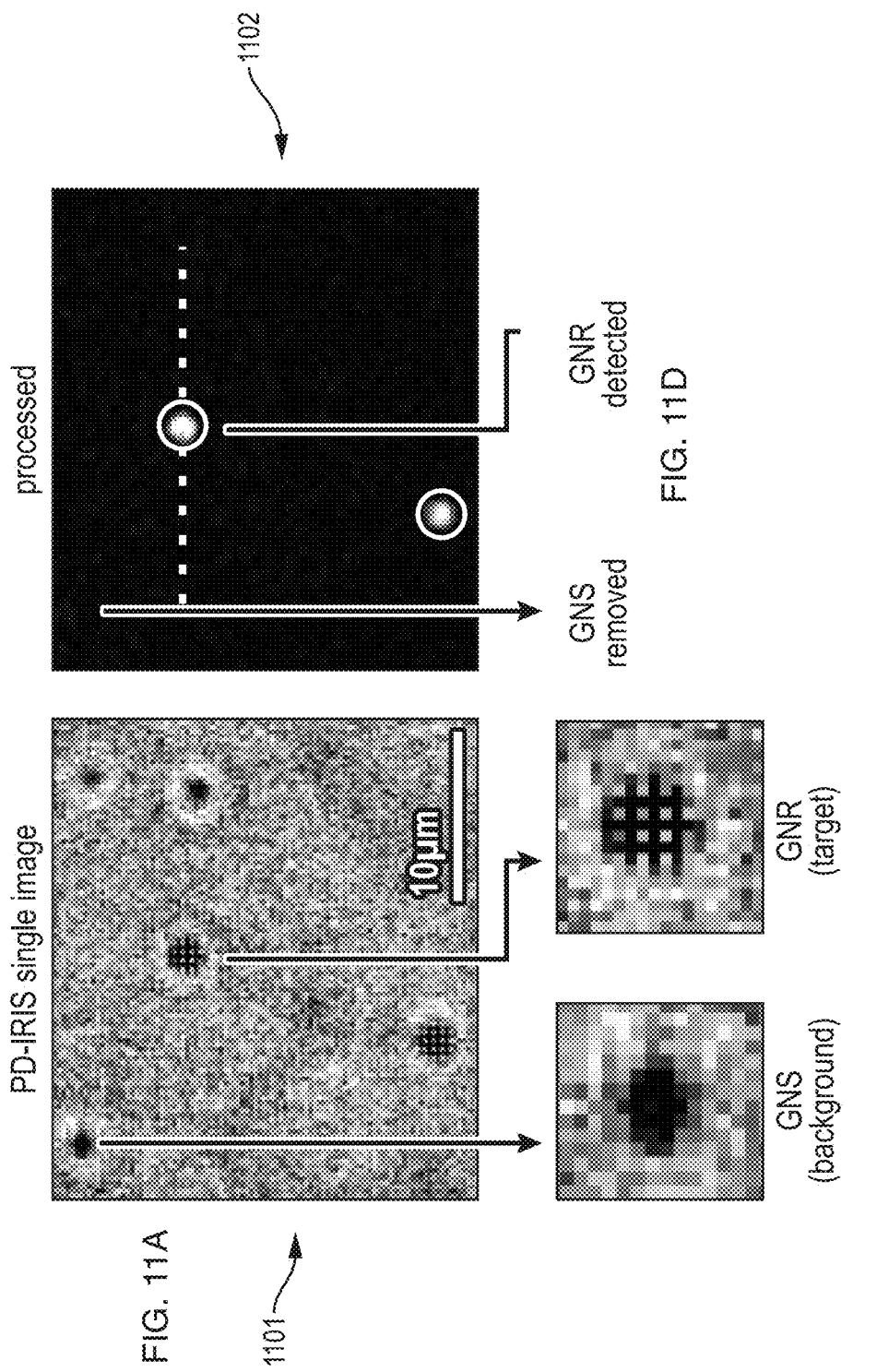

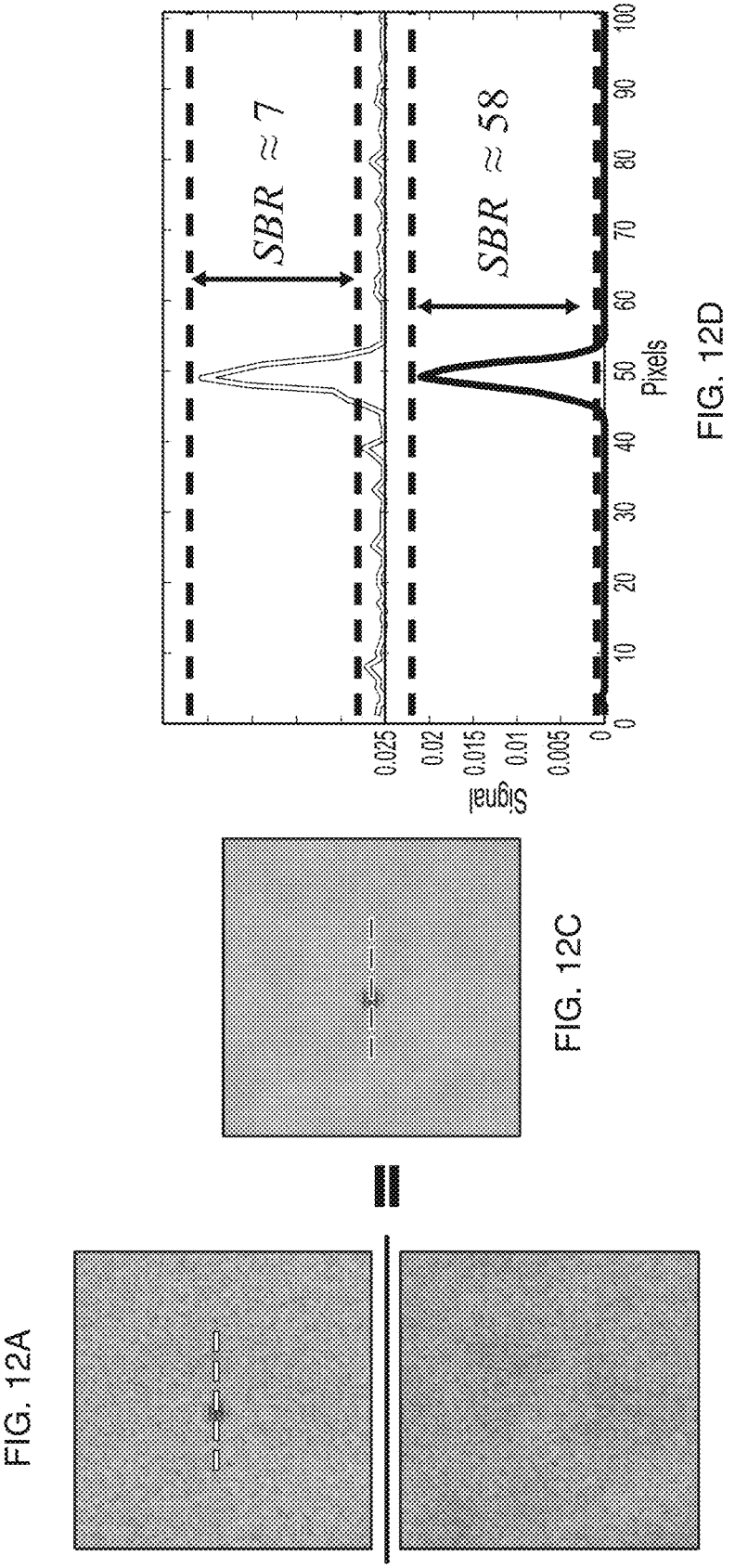

PIXEL-DIVERSITY NANOPARTICLE DETECTION BY INTERFEROMETRIC REFLECTANCE IMAGING SENSOR

RELATED APPLICATION

This application claims the benefit of U.S. Provisional Application No. 63/476,042, filed on Dec. 19, 2022.

The entire teachings of the above application are incorporated herein by reference.

GOVERNMENT SUPPORT

This invention was made with government support under Grant No. 1941195 from the National Science Foundation. The government has certain rights in the invention.

BACKGROUND

Naturally occurring biological nanoparticles (BNPs) and synthetic nanoparticles have a significant role in a wide range of biomedical applications. For instance, direct detection of BNPs, such as viruses, can provide new methods of viral diagnostics while synthetic particles can be used as labels to indirectly detect biomarkers for drug discovery. Therefore, developing advanced tools for nanoparticle detection has gained popularity in biotechnological research. One exciting recent development in BNP detection has been single particle (or digital) counting of individual particles which offers improved sensitivity levels. However, standard optical techniques face a significant challenge for nanoparticle detection, due to the weak optical contrast of sub-wavelength particles. Interferometric microscopy overcomes the limitations imposed by particle size which allows for visualizing unresolved (diffraction-limited) optical signatures of subwavelength particles. Single-particle interferometric reflectance imaging sensor (SP-IRIS) is a widefield microscopy platform which uses interferometric enhancement and a layered substrate to increase the optical contrast for the target particles of interest. While this microscopy technique has shown remarkable sensitivity levels for numerous applications including detection of viral particles and nucleic acids, it has remained a specialty tool due to the utilization of z-scan measurements for extracting the optical signature of particles. The z-scan measurements that involve multiple frames acquired at different focal positions imposes two major drawbacks. The first is the dependence of additional optical components and the second is the time and computational processing power required to analyze the image stacks. Thus, there is a need for a faster imaging technique which enables single BNP detection with higher sensitivity.

SUMMARY

According to one aspect of the subject matter described in this disclosure, a novel imaging method termed 'pixel-diversity' IRIS (PD-IRIS) is provided. It aims to provide a more practical detection method for nanoparticles by eliminating the need for acquiring measurements of multiple images at different focal positions (also referred to herein as z-stacks). PD-IRIS is built upon SP-IRIS; however, it introduces a paradigm shift for encoding the necessary optical signature of target particles. PD-IRIS can compress the relevant optical information within a single image frame rather than an image stack. This can be achieved by using camera sensors that simultaneously record multiple components of optical information.

In some implementations, the target molecules are incubated on an IRIS chip through a fluidic channel and immobilized on a target spot.

In some implementations, the immobilized target particles are excited with a light that contains different distinct optical information and the changes in that information are measured using different sensors.

According to one aspect of the subject matter described in this disclosure, the target molecules are excited with a light that contains different spectral information, and the response is recorded with a color camera.

According to one aspect of the subject matter described in this disclosure, the target molecules are excited with unpolarized light, and the response is recorded with a sensor that has a polarization filter array in front.

In some implementations, the illumination light is collimated and focused using a series of optical lenses.

In some implementations, a silicon dioxide coated silicon chip is used to reflect the incoming illumination light and increase the back scattered light from the target particle.

In some implementations, the reflected and the back scattered light is collected and focused on the imaging sensor using multiple optical lenses.

Aspects of inventive concepts relate to an interferometric reflectance imaging system for detection of nanoparticles. The interferometric reflectance imaging system can include an imaging sensor including pixels that are preferentially sensitive to a plurality of light components; an illumination source configured to emit illumination light along an illumination path, the illumination light including the plurality of light components; and a target including a target substrate configured to support one or more nanoparticles on a surface of the target substrate, the target configured to receive the illumination light from the illumination path and reflect light along a collection path toward the imaging sensor, each nanoparticle on the target substrate producing reflected light with different characteristics for each one of the plurality of light components of the illumination light. The system may be configured to, at a nominal focus position: generate an image at the imaging sensor based, at least in part, on the light reflected from the target interfering with light scattered from nanoparticles on the target substrate; and process the image to detect the nanoparticles on the target substrate.

The plurality of light components emitted by the illumination source can be different spectra of light and the imaging sensor can be a multi-spectral camera.

The illumination source can include two or more narrow-band light sources.

The narrow-band light sources may be light-emitting diode (LED) sources, and each LED source may emit light at a different wavelength.

The different spectra of light can be red, blue, and green in the visible spectrum and the imaging sensor can be a color camera.

The nanoparticles can be biological nanoparticles.

The nanoparticles can include at least one of viruses, exosomes, or other macromolecules.

The nanoparticles can include at least one of a gold nanosphere, a dielectric nanoparticle, or any other type of artificial nanoparticle.

The nanoparticles can have dimensions in a range of about 10 to about 100 nanometers.

The plurality of light components of the illumination light emitted by the illumination source can be different polarizations of light and the imaging sensor can be a polarization camera.

The polarization camera can include pixels nominally sensitive to 0, 45, 90, and 135 degrees of linearly polarized light.

The illumination source can emit randomly polarized light.

The illumination source can include an LED light source.

The nanoparticles can be rod-shaped nanoparticles.

The rod-shape nanoparticles can be gold nanorods.

The gold nanorods can have dimensions in a range of about 10 to about 100 nanometers.

The illumination source can be a narrow spectrum light source configured to emit light with characteristics matching the optical resonance of the rod-shaped nanoparticles.

The illumination source can include an LED light source with an emission spectrum nominally matching the optical resonance of the gold nanorods on the surface of the target substrate.

The imaging sensor can include at least one superpixel. Each superpixel can include: a first pixel configured to be selectively sensitive to linearly polarized light along a first axis; a second pixel configured to be selectively sensitive to linearly polarized light oriented 45 degrees relative to the first axis; a third pixel configured to be selectively sensitive to linearly polarized light oriented 90 degrees relative to the first axis; and a fourth pixel configured to be selectively sensitive to linearly polarized light oriented 135 degrees relative to the first axis.

The imaging sensor can be configured to form at least one image and the imaging system can further include a processor configured to analyze the at least one image from the imaging sensor.

The target substrate can include a base substrate having a first reflecting surface and a transparent spacer layer having a first surface in contact with the first reflecting surface and a second reflecting surface on a side opposite to the first surface. The transparent spacer layer can have a predefined thickness that can be determined as a function of a wavelength of the illuminating light and can produce a predefined radiation pattern of optical scattering when nanoparticles are positioned on or near the second reflective surface.

The imaging sensor can include pixels that are diverse in sensitivity to the plurality of light components, a first type of the pixels being preferentially sensitive to a first component of the plurality of light components, a second type of the pixels being preferentially sensitive to a second component of the plurality of light components.

At a nominal focus position, the system can be configured to process the image to extract one or more optical properties of the nanoparticles on the target substrate.

Aspects of inventive concepts relate to a method for detection of nanoparticles. The method may include: providing a target including a target substrate and one or more nanoparticles on the surface of the target substrate; illuminating the target substrate with a multitude of light components along an illumination path; collecting light reflected and scattered from the target on an imaging sensor including pixels preferentially sensitive to the plurality of light components; at a nominal focus point, generating an image at the imaging sensor based on interference of the light reflected and scattered from the target; and at a nominal focus point, processing the image to detect the nanoparticles on the target substrate.

The imaging sensor may include pixels that are diverse in sensitivity to the plurality of light components, a first type of the pixels being preferentially sensitive to a first component of the plurality of light components, a second type of the pixels being preferentially sensitive to a second component of the plurality of light components.

The processing the image may include calculating a variance for each pixel.

The imaging sensor may include at least one superpixel. Each superpixel may include: a first pixel configured to be selectively sensitive to linearly polarized light along a first axis; a second pixel configured to be selectively sensitive to linearly polarized light oriented 45 degrees relative to the first axis; a third pixel configured to be selectively sensitive to linearly polarized light oriented 90 degrees relative to the first axis; and a fourth pixel configured to be selectively sensitive to linearly polarized light oriented 135 degrees relative to the first axis.

The processing the image may include calculating a signal for each superpixel based on a square of the difference between an intensity collected at the third pixel and an intensity collected at the first pixel added to a square of the difference between an intensity collected at the fourth pixel and an intensity collected at the second pixel.

The method may further include, at a nominal focus point, processing the image to extract one or more optical properties of the nanoparticles on the target substrate.

Aspects of inventive concepts relate to an interferometric reflectance imaging system for detection of nanoparticles. The interferometric reflectance imaging system may include: an imaging sensor including pixels that are diverse in sensitivity to a plurality of light components, a first type of the pixels being preferentially sensitive to a first component of plurality of light components, a second type of the pixels being preferentially sensitive to a second component of the plurality of light components; an illumination source configured to emit illumination light along an illumination path, the illumination light including the plurality of light components; a target including a target substrate configured to support one or more nanoparticles on a surface of the target substrate, the target configured to receive the illumination light from the illumination path and reflect light along a collection path toward the imaging sensor, each nanoparticle on the target substrate producing reflected light with different characteristics for each one of the plurality of light components of the illumination light; and a processor configured to receive an image from the imaging sensor and process the received image to identify at least one high contrast area that corresponds to at least one of the nanoparticles, wherein the high contrast area includes a pixel value substantially different from values in neighboring pixels.

The imaging system may further include one or more collection optics positioned in the collection path between the target and the imaging sensor, the one or more collection optics may be configured to align a focal point for at least two colors, and optionally the transparent spacer layer may have a thickness of about 60 nanometers or about 120 nanometers.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3A shows an example embodiment of an IRIS chip. FIG. 3B is an exploded schematic illustration of an example embodiment of chip assembly including an IRIS chip, a spacer, and a cover. FIG. 3C is a schematic illustration of an example embodiment of a chip assembly functionalization, where a surface of the IRIS chip is functionalized to capture and/or immobilize target molecules or target particles.

FIGS. 4A-4D illustrate signal acquisition and data processing for the single particle interferometric reflectance imaging sensor (SP-IRIS) and pixel diversity interferometric reflectance imaging sensor (PD-IRIS) systems, in accordance with aspects of inventive concepts.

FIG. 10A shows an experimental image from a polarization PD-IRIS system, in accordance with aspects of inventive concepts.

FIG. 10B shows a magnified view of a region the experimental image from FIG. 10A, showing a particle of interest imaged with a checkerboard pattern, in accordance with aspects of inventive concepts.

FIG. 10C shows a processed image based on information from the experimental image of FIG. 10A, in accordance with aspects of inventive concepts.

FIG. 10D shows a magnified view of a region the processed image from FIG. 10C, showing a particle of interest with background suppressed and signal enhanced, in accordance with aspects of inventive concepts.

FIGS. 11A-11D shows an example comparison of how spherical particles and gold nanorods appear in polarization PD-IRIS images, in accordance with aspects of inventive concepts.

FIGS. 12A-12D illustrates an example signal enhancement achieved by look-up-table normalization, in accordance with aspects of inventive concepts.

DETAILED DESCRIPTION

A description of example embodiments follows.

Pixel Diversity IRIS (PD-IRIS), built upon SP-IRIS, introduces a new method for encoding the optical signature of particles necessary for detection. In various example embodiments, the new method compresses the optical information within a single image frame rather than an image stack by utilizing cameras with filters (for example, on-sensor filters or filter arrays) or pixels configured to be sensitive to a plurality of light components. These filters and/or specialized pixels, can simultaneously recording multiple channels that encode distinct responses of a target particle. Therefore, a single image can be sufficient to detect the presence of a particle.

PD-IRIS has several advantages compared SP-IRIS: there are no scanning elements necessary for z-stack acquisition; and the dimensionality of the data acquired is reduced, therefore the data size is compressed. This size compression consequently decreases the acquisition and processing time.

The illustration of the physical principle of interferometric imaging is given in FIG. 11. A target 100 comprising a target substrate 111 and a target particle 101 (with polarizability $\alpha$ and permittivity $\varepsilon_p$) is excited with incident electric field $E_i$.

Figure 1:
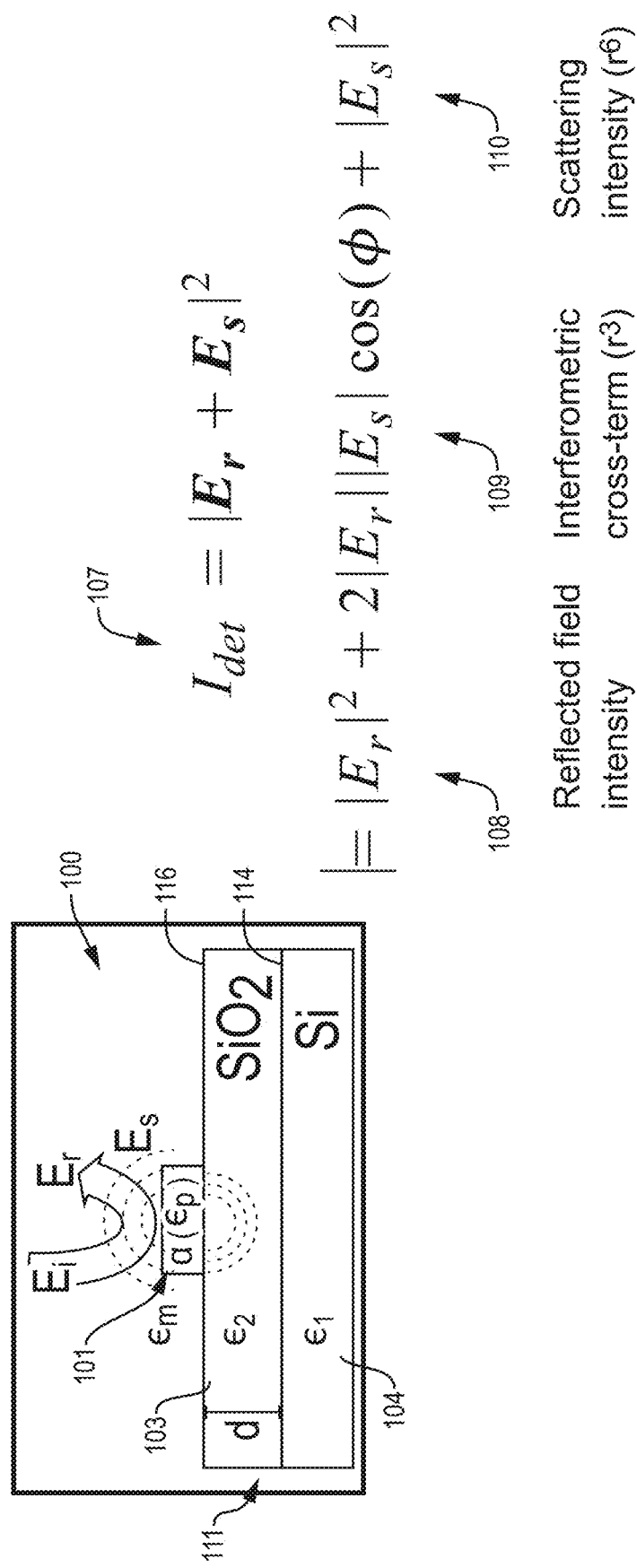
FIG. 1 is an illustration of the physical principles of an interferometric reflectance imaging sensor (IRIS), in accordance with aspects of inventive concepts.

In various example embodiments, the target substrate 111 comprises two layers: a transparent layer 103 (for example, silicon dioxide) with a permittivity $\varepsilon_2$ and a base substrate 104 (for example, silicon) with a permittivity $\varepsilon_1$. In various embodiments, the base substrate 104 comprises a first reflecting surface 114. In various embodiments, the transparent layer 103 comprises a second reflecting surface 116. In various embodiments, the thickness d of the transparent layer is designed to increase the backward scattering electric field $E_s$ of target particle 101. The resulting scattering electric field $E_s$ and reflected electric field $E_r$, are collected and they interfere on an imaging sensor. The resulting sensor reading 107 can be separated into three parts: reflected field intensity 108, interferometric cross-term 109, and scattering intensity 110. For particles whose diameter is less than a micron, the scattering intensity term can be neglected because it is proportional to the radius of the particle raised to the sixth power ($r^6$). The interferometric cross-term is proportional to the radius of the particle raised to the third power ($r^3$). In the example shown in FIG. 1, the particle 101 is partially surrounded by a medium with a permittivity $\varepsilon_m$.

In various example embodiments, the thickness d of the transparent layer may be 60 nm. In various example embodiments, the thickness d of the transparent layer may be 120 nm. In various example embodiments, the thickness d of the transparent layer may be a different thickness. The target substrate 111 may include a base substrate 104 having a first reflecting surface 114 and a transparent spacer layer 103 having a first surface in contact with the first reflecting surface and a second reflecting surface 116 on a side opposite to the first surface, and wherein the transparent spacer layer 103 has a predefined thickness d that is determined as a function of a wavelength of the illuminating light and produces a predefined radiation pattern of optical scattering when nanoparticles 101 are positioned on or near the second reflective surface 116.

The single-particle interferometric reflectance imaging sensor (SP-IRIS) approach has shown remarkable sensitivity levels for numerous applications such as label-free detection of viruses and detection of nucleic acids labeled with nanoparticles. However, it has remained a specialty tool that requires image acquisition at different focal planes of the sample to encode the optical signature of a particle of interest within a 3D image cube, also known as a z-stack. The z-stack measurements, although proven to be a powerful tool for nanoparticle detection, impose major drawbacks that limit the SP-IRIS platform's practical applications. The drawbacks include the necessity of precise hardware that enables repeatable and high-resolution positioning of scanning optics, and the processing power required to analyze the high-volume image stacks.

Figure 2A:
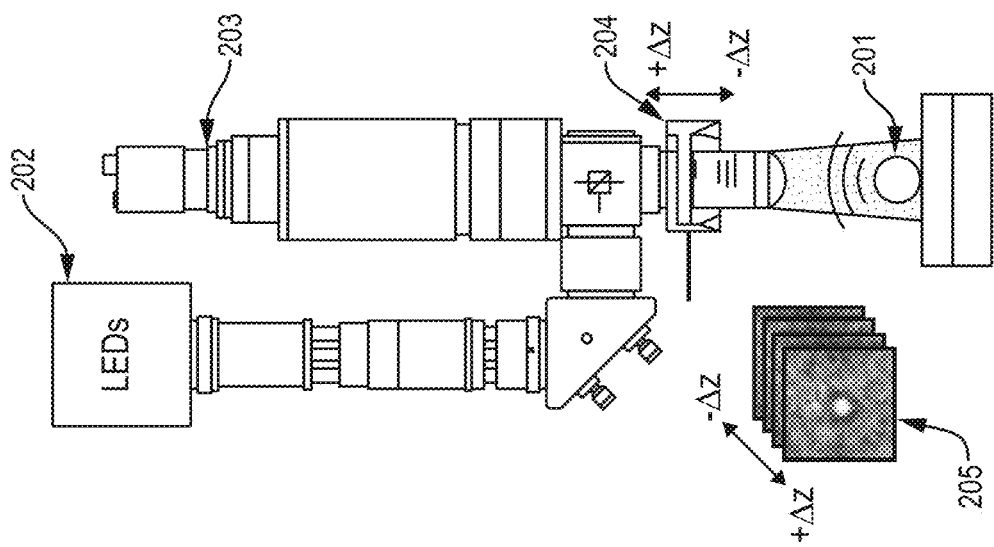
FIGS. 2A-2C show an example embodiment of a single-particle IRIS (SP IRIS) setup and some associated data.
Figure 2C:
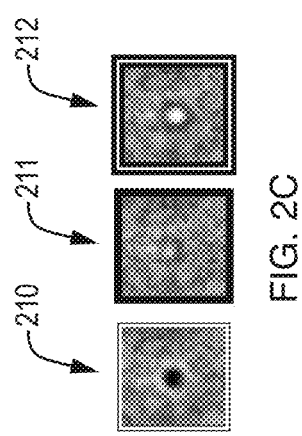
Figure 2B:
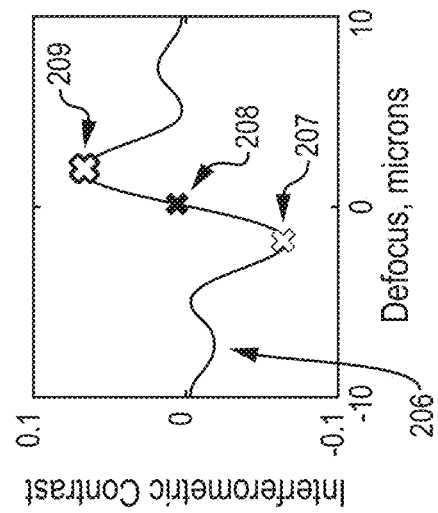

The basic principle of SP-IRIS is shown in FIGS. 2A-2C. In SP-IRIS, immobilized particles 201 are excited with light coming from an illumination source 202 (see FIG. 2A). The resulting scattered light and reflected light are captured with an image sensor, e.g., a camera 203. To construct the SP-IRIS signal, multiple images of immobilized particles 201 are recorded across the nominal focus position by using a piezo objective scanner 204. The resulting image group is called a z-stack 205. A given particle appears to have different contrast in different images of the z-stack. This characteristic is demonstrated in the defocus curve 206 along with the different images of the same particle in the z-stack 210, 211, 212 (see FIGS. 2B-2C). As shown in FIG. 2B, in this example, three points 207, 208, 209 are indicated. FIG. 2C shows a first image 210 corresponding to the first point 207, a second image 211 corresponding to the second point 208, and a third image 212 corresponding to the third point 209.

Figure 3C:
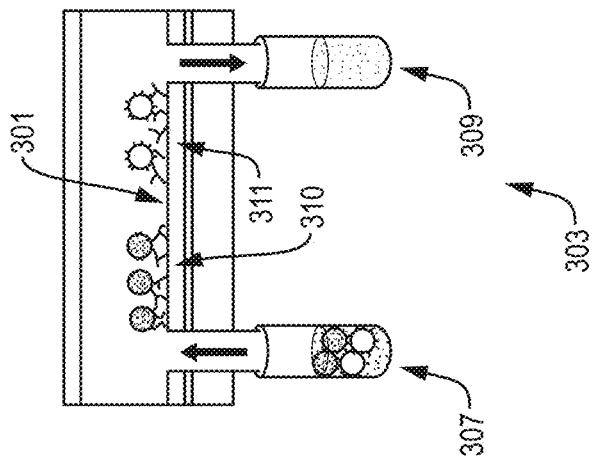
FIGS. 3A-3C illustrate example components for use in an interferometric reflectance imaging system, in accordance with aspects of inventive concepts.
Figure 3B:
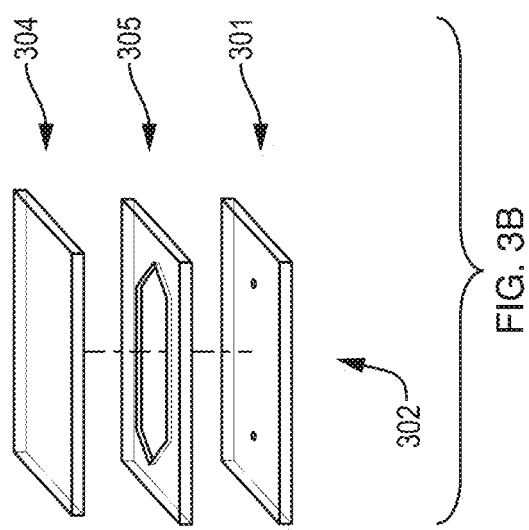
Figure 3A:
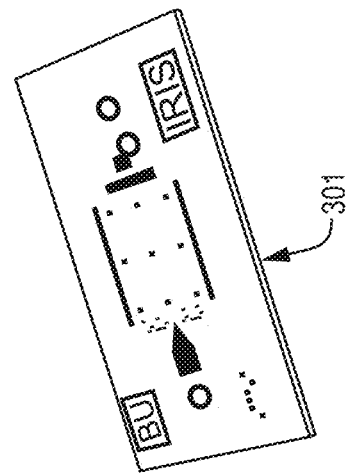

In various example embodiments, the target particles are incubated and immobilized on a silicon dioxide coated silicon chip. FIGS. 3A-3C illustrate example components of a fluidic channel for the incubation of the particles. In various embodiments, a fluidic channel 302, 303 is used for immobilizing target particles on the IRIS sensor. In various example embodiments, the channel 302 comprises three layers: cover glass 304, adhesive tape 305, and IRIS sensor 301 (see FIG. 3B). Cover glass 304 restricts the sample fluid on top and provides a clear and flat surface for imaging the surface of the IRIS chip 301. The adhesive tape 305 creates a gap between the cover glass 304 and IRIS chip 301. The fluidic channel 303 may comprise a sample tube 307, chip 301, and a waste 309 (see FIG. 3C). The samples are flown on the chip 301 and captured on different spots 310 and 311 designed for different particles.

Figure 15:
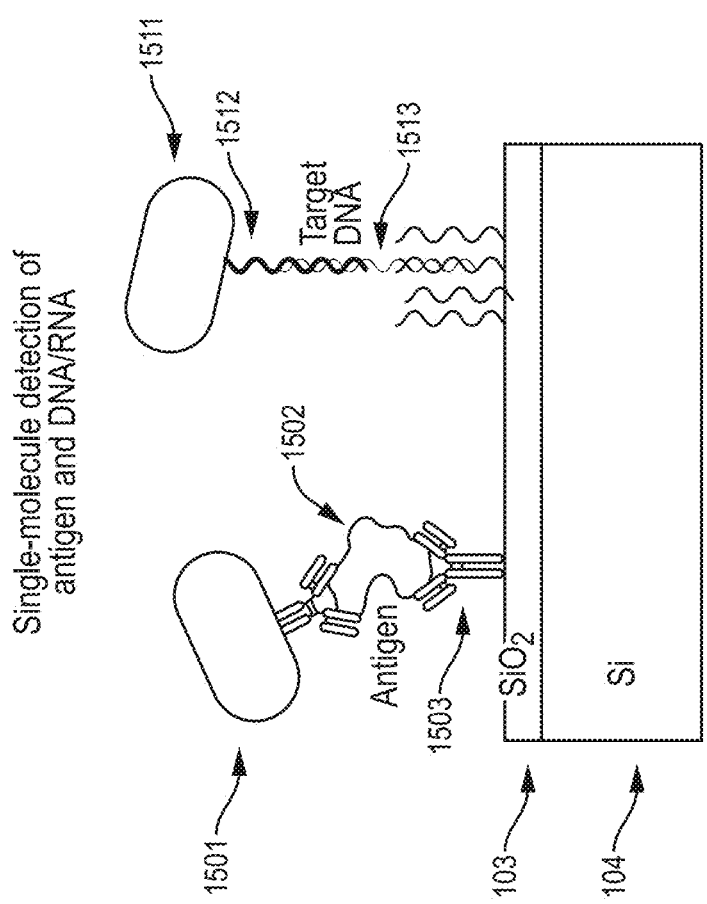
FIG. 15 shows an example embodiment of labeling target biomolecules.

An example labeling method of target molecules is demonstrated in FIG. 15. There are multiple ways to label target biomolecules in PD-IRIS. If the target molecule is an antigen or an antibody, the label particle 1501 is functionalized with the target molecule 1502, and the functionalized particle is captured on the conjugate antibody 1503. If the target molecule is a DNA or RNA sequence, the label particle 1511 is functionalized with a DNA or RNA sequence 1512 which corresponds to some part of the target DNA or RNA sequence, and they are captured on the sensor chip with using another DNA or RNA sequence 1513 which corresponds to the remaining part of the target DNA or RNA sequence.

An improvement introduced in PD-IRIS is that it enables detection of a particle 101 of interest with a single snapshot image rather than multiple of images captured at different focal positions. FIGS. 4A-4B compares the concept of SP-IRIS with PD-IRIS. In FIG. 4A, the conventional SP-IRIS with a sensor 404 illuminates the particle 401 captured on the layered substrate 402 and acquires images 405 at different focal planes (z-stack: z1, z2, z3), which carries the necessary information to detect the particle 401. A single image 407 is then extracted from the z-stack (i.e., images at different focal planes) by calculating the variation between the images.

A PD-IRIS system illuminates a particle 411 on a layered substrate 412 and acquires a single image that encodes the distinct signal of the particle 411 by employing a camera 414 with pixels that are preferentially sensitive to a plurality of light components (see FIG. 4B). In the example shown in FIG. 4B, the pixels of the image sensor are preferentially sensitive due to the presence of a filter array 416. The single image carries the relevant information for particle detection; therefore, the z-stack acquisition steps are prevented.

FIG. 4C shows an example embodiment of spectral PD-IRIS, in accordance with aspects of inventive concepts. A spectral PD-IRIS system illuminates a particle 421 on a layered substrate 422 and acquires a single image that encodes the distinct signal of the particle 421 by employing a camera 424 with pixels that are preferentially sensitive to a plurality of light components. In the example shown in FIG. 4C, the pixels of the image sensor are preferentially sensitive due to the presence of a Bayer filter array 426. The single image carries the relevant information for particle detection; therefore, the z-stack acquisition steps are prevented. The Bayer filter array includes at least one set of one blue pixel, one red pixel, and two green pixels.

FIG. 4D shows an example embodiment of polarization PD-IRIS, in accordance with aspects of inventive concepts. A spectral PD-IRIS system illuminates a particle 431 on a layered substrate 432 and acquires a single image that encodes the distinct signal of the particle 431 by employing a camera 434 with pixels that are preferentially sensitive to a plurality of light components. In the example shown in FIG. 4D, the pixels of the image sensor are preferentially sensitive due to the presence of a polarization filter 436. The example shown also includes a microlens array 438. The microlens array 438 may help reduce crosstalk between pixels. The single image carries the relevant information for particle detection; therefore, the z-stack acquisition steps are prevented.

One or more of the target particles described herein may be the same as each other. One or more of the substrates described herein may be the same as each other. The target particles described herein may be positioned on the target substrate. The target particles described herein may be positioned at least partially in a portion of the target substrate.

Figure 5:
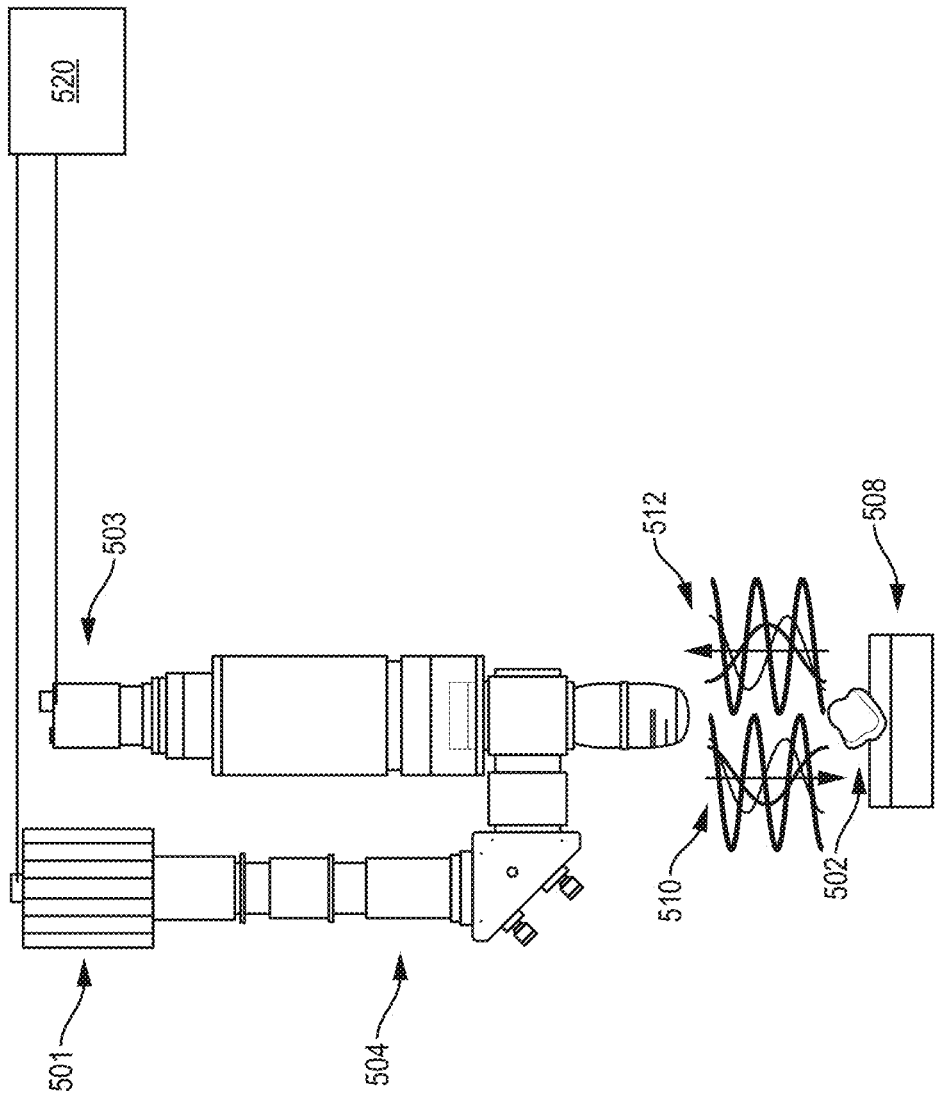
FIG. 5 shows an example embodiment of a spectral PD-IRIS system, in accordance with aspects of inventive concepts.

FIG. 5 shows an example embodiment of a spectral PD-IRIS system, in accordance with aspects of inventive concepts. In various embodiments, a PD-IRIS system comprises an imaging sensor 503, an illumination source 501, and a target. The target may include a target substrate 508. In various embodiments, the system is configured to, at a nominal focus position: generate an image at the imaging sensor 503 based, at least in part, on the light reflected from the target substrate 508 interfering with light scattered from nanoparticles 502 on the target substrate 508; and process the image to detect the nanoparticles 502 on the target substrate.

In various embodiments, the imaging sensor comprises pixels that are preferentially sensitive to a plurality of light components. Examples of light components include but are not limited to colors or polarization state. In various embodiments, pixels that are preferentially sensitive to a plurality of light components may refer to pixels that are configured to be sensitive to a plurality of light components. In various embodiments, pixels that are preferentially sensitive to a plurality of light components may refer to pixels associated with on-sensor filters that filter certain light components. In various embodiments, pixels that are preferentially sensitive to a plurality of light components may refer to pixels associated with filters that are not directly coupled to the imaging sensor that filter certain light components. Example components that may facilitate pixels being preferentially sensitive may include a Bayer filter (see FIG. 4C) or a polarization filter (see FIG. 4D).

In various embodiments, one or more of the pixels are diverse in sensitivity. For example, a first pixel may be preferentially sensitive to blue light and a second pixel may be preferentially sensitive to red light. In another example, a first pixel may be preferentially sensitive to light with a certain polarization and a second pixel may be preferentially sensitive to light with a different polarization.

In various embodiments of PD-IRIS, the immobilized target molecules can be excited with a light that has multiple spectrum content. This configuration of PD-IRIS is called spectral PD-IRIS. A sketch of a spectral PD-IRIS system is illustrated in FIG. 5. In various example embodiments, the multiple illumination sources (for example, LEDs, lasers, etc,), are uniformly mixed inside the illumination device 501 and provided to the optical system 504 from one output. The output light 510 is collimated on the sample 502 using multiple optical lenses. The response from the particle and the reflected light 512 is then focused on the camera sensor 503 which has a color filter array in front of it. In alternative embodiments, the multiple illumination sources may be housed separately.

In various embodiments, such as the example shown in FIG. 5, the spectral PD-IRIS system comprises a processor 520 coupled to the illumination device 501 and the camera sensor 503. In alternative embodiments, the processor 520 may be coupled to one of the illumination device 501 or the camera sensor 503.

In various embodiments, the target particles (either labelled or unlabeled) are immobilized on an IRIS chip, and they are excited with an illumination light that has multiple spectral components. A mask may be employed to ensure only low numerical aperture illumination. In various embodiments, after the particles are excited, both the scattered and reflected light is collected with the same objective and imaged onto a color camera sensor. In alternative embodiments, the target may be illuminated with a first objective and the reflected and scattered light may be collected by a second objective. In various embodiments, the objective may be an achromat objective. In various embodiments the objective may be an apochromatic objective. Due to the Bayer color filter array (see FIG. 4C), superpixels (for example, 4 pixels with red, blue and two green filters) that capture the image of the particle of interest would have checkerboard pattern whereas that feature would be absent in the background.

In the embodiment shown in FIG. 5, the illumination and collection optics are positioned 'above' the target. In other words, the illumination and collection optics may be positioned such that the target particle is located between the illumination and collection optics and the substrate, as illustrated in FIG. 5. In alternative embodiments, the illumination and/or collection optics may be positioned 'below' the target. In general, the illumination and collection optics may be positioned relative to the target particle to allow detection of the target particle. In the embodiment shown in FIG. 5, most of the illumination and collection path is enclosed. In alternative embodiments, a substantial portion of the illumination and/or collection path may not be enclosed.

Figure 6:
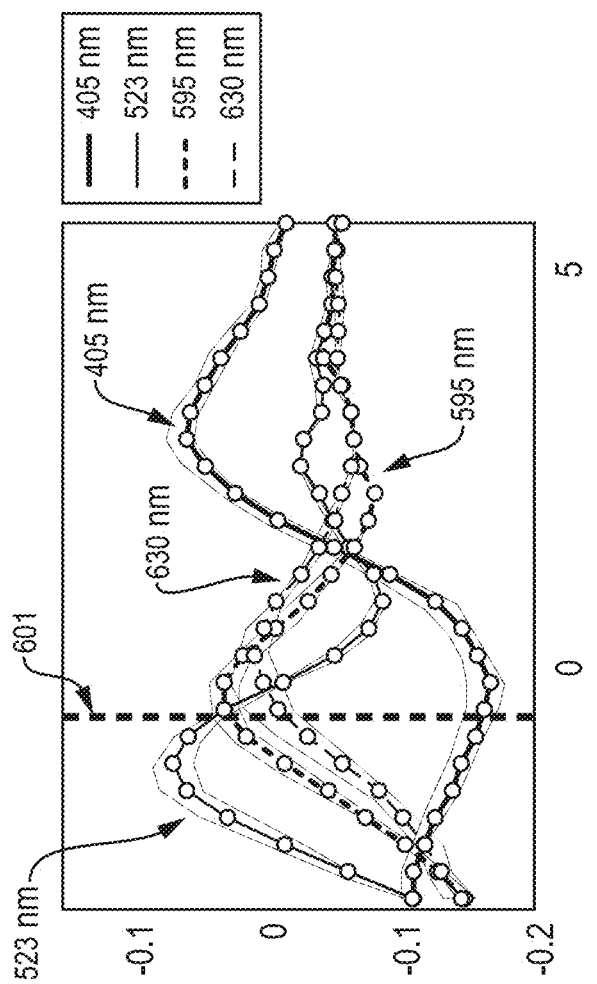
FIG. 6 shows example experimental defocus curves of 80 nm gold nanosphere particles imaged under 20× magnification objective lens illuminated with different wavelengths of light, in accordance with aspects of inventive concepts.

FIG. 6 shows example experimental defocus curves of 80 nm gold nanosphere (GNS) particles. The particles are excited and imaged with a 20× objective lens. This data shows how chromatic aberrations affect spectral PD-IRIS. The dashed line 601 indicates a position where the contrast for violet is dark and other colors are bright. At this position, the variation across the color channel is high, thus, target particles appear as bright spots in the processed image. Four curves corresponding to illumination light at 405 nm, 523 nm, 595 nm, and 630 nm, respectively, are shown in FIG. 6. In alternative embodiments, different wavelengths of illumination light may be used.

Figure 7:
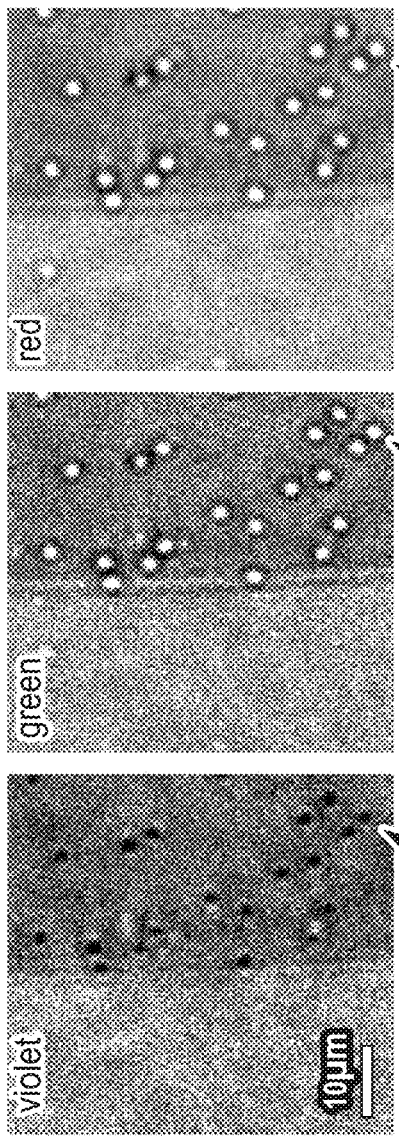
FIGS. 7A-7C show the images of the same particles of FIG. 6, which are illuminated with different colors, in accordance with aspects of inventive concepts.

The optical response of the same 80 nm gold nanosphere (GNS) particles to different color illumination is demonstrated in the three experimental images shown in FIGS. 7A-7C. All the images are captured at the location indicated with a dashed line 601 in FIG. 6. FIG. 7A shows illumination with violet light. FIG. 7B shows illumination with green light. FIG. 7C shows illumination with red light. An example target particle 701 is identified in each image. Contrast for the gold nanosphere particles is dark under violet light and bright under green and red light.

In various example embodiments, with spectral PD-IRIS a particle is detected by comparing a value at a given pixel with the values of the neighboring pixels and calculating a variance. In various example embodiments, the value at each pixel in a processed image is replaced with the calculated variance associated with that pixel. In various example embodiments, the neighboring pixels included in the variance calculation are those within a diffraction-limited spot size. In various example embodiments, the neighboring pixels included in the variance calculation are those within the image. In various example embodiments, the neighboring pixels included in the variance calculation are a subset of those within the image.

In various embodiments, at a fixed focus position, different color images are acquired sequentially using a monochromatic camera. The images may be concatenated into a 3D image cube and processed with a 3D variance filter, hence, the variation with respect to spectral channels is calculated. The filter may compute the variance within the moving 3D kernel. Each pixel is then replaced by the neighborhood variance, therefore highlighting the high variation pixels caused by the presence of a particle. The kernel, or the neighborhood, size is chosen to be the size of the diffraction limited spot size in pixels and the third dimension is the number of color channels. For instance, 4 pixels×4 pixels×3 colors for the 20× magnification.

Figure 8:
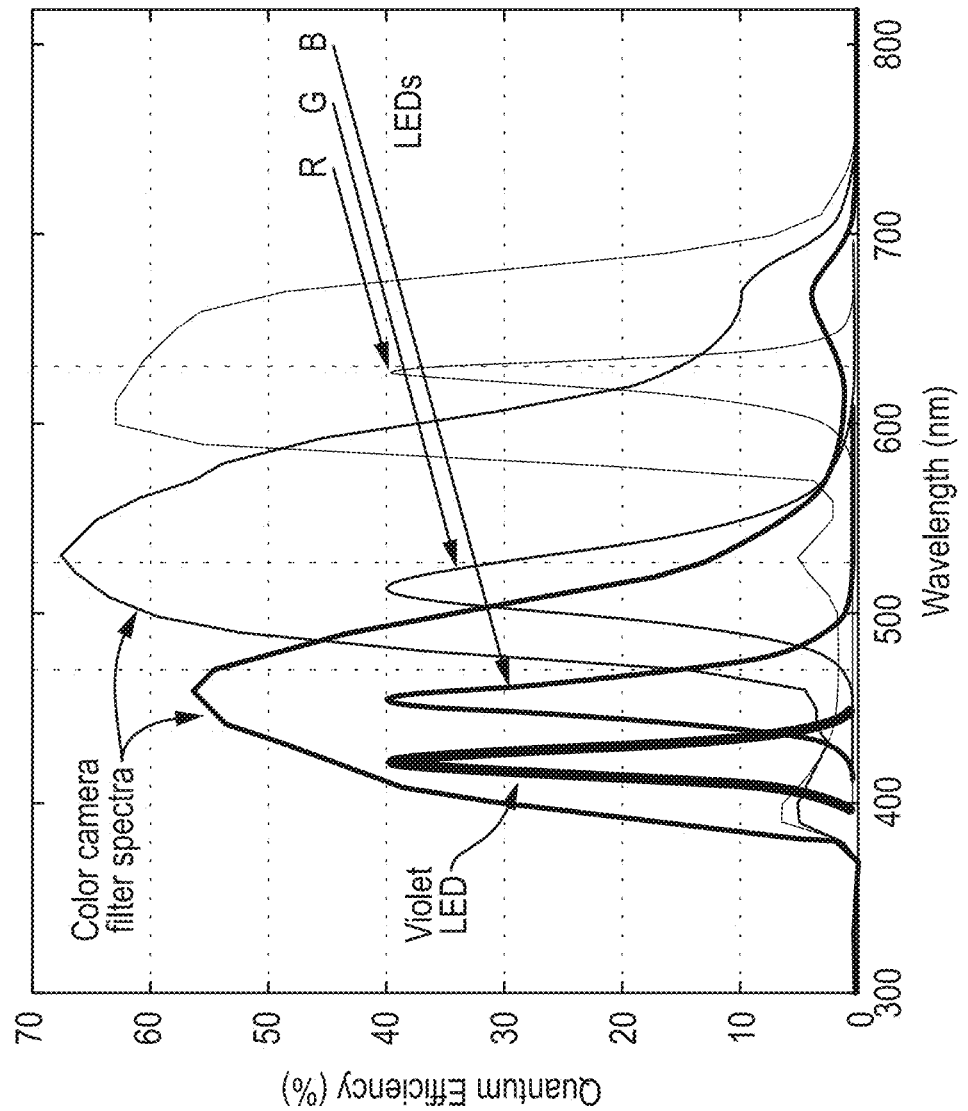
FIG. 8 shows example spectrums of an example embodiment of a color filter array and example spectrums of several example LEDs, in accordance with aspects of inventive concepts.

The spectrum of an example color filter array is demonstrated in FIG. 8. The selection of LED spectrum is crucial for spectral PD-IRIS. The LED spectrum must be separated and well filtrated for a given color channel to avoid channel crosstalk. Spectrums of some commercial LEDs are also included in FIG. 8. In alternative embodiments, different narrow-band light sources may be used. In alternative embodiments, different filter arrays and/or different illumination spectrum ranges may be used.

Figure 9:
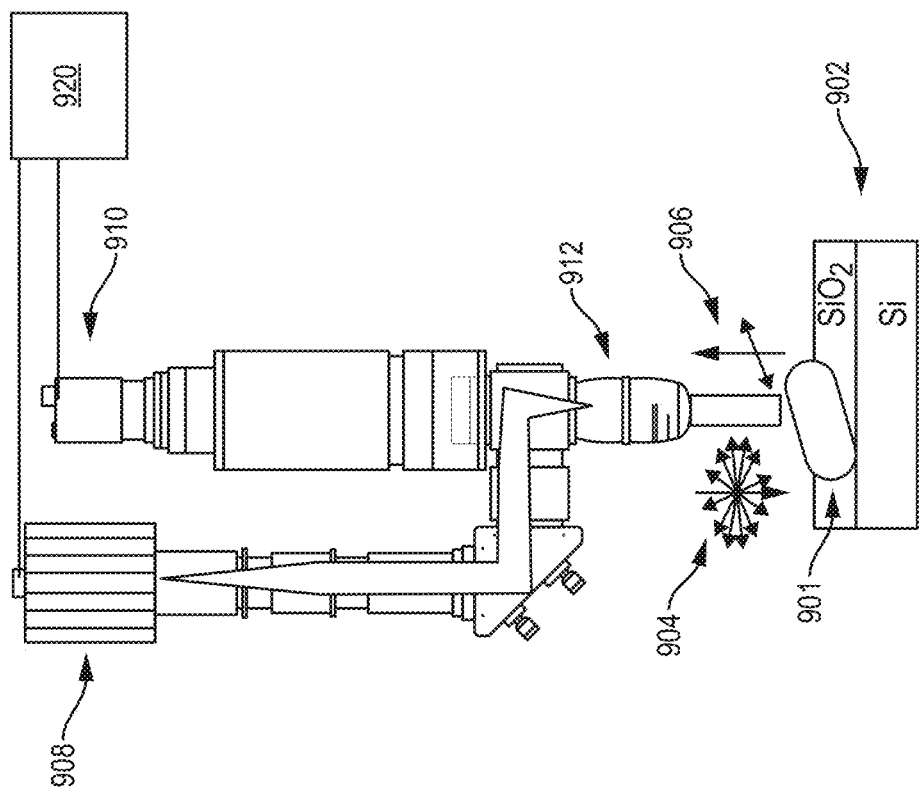
FIG. 9 shows an example embodiment of a polarization PD-IRIS system, in accordance with aspects of inventive concepts.

FIG. 9 shows an example embodiment of a polarization PD-IRIS system, in accordance with aspects of inventive concepts. In various embodiments, the elements of the system are the same or similar to elements used in the spectral PD-IRIS setup. The different assembly configurations described in connection with FIG. 5, also apply to the system described in connection with FIG. 9.

In various embodiments of polarization PD-IRIS, plasmonic nanorods are used as target labels and they are excited with a unpolarized light 904 from an illumination source

908. The target particles 901 (for example, gold nanorod (GNR) particles) are immobilized on a target substrate 902 (for example, an IRIS chip) and they are excited with unpolarized light 904 at the appropriate wavelength which corresponds to their scattering resonance. A mask may be employed to ensure only low numerical aperture illumination. After the GNRs are excited, both the back-scattered and reflected light 906 is collected with the same objective lens 912 and imaged onto a polarization camera sensor 910.

In various embodiments, such as the example shown in FIG. 9, the spectral PD-IRIS system comprises a processor 920 coupled to the illumination device 908 and the camera sensor 910. In alternative embodiments, the processor 920 may be coupled to one of the illumination device 908 or the camera sensor 910.

Due to the polarization filter array employed in polarization PD-IRIS, 4 pixels with two sets of orthogonal filter pairs constitutes a superpixel. In a superpixel, different polarization information of the combination of back scattered and reflected light is measured. When a nanorod label exists, it appears as a checkerboard pattern in the image whereas that feature would be absent in the background (see FIGS. 10A-10D).

In various embodiments, the imaging sensor polarization PD-IRIS system comprises at least one superpixel. In various embodiments, each superpixel comprises a first pixel configured to be selectively sensitive to linearly polarized light along a first axis; a second pixel configured to be selectively sensitive to linearly polarized light oriented 45 degrees relative to the first axis; a third pixel configured to be selectively sensitive to linearly polarized light oriented 90 degrees relative to the first axis; and a fourth pixel configured to be selectively sensitive to linearly polarized light oriented 135 degrees relative to the first axis.

In various embodiments, processing an image polarization PD-IRIS system comprises calculating a signal for each superpixel based on a square of the difference between an intensity collected at the third pixel and an intensity collected at the first pixel added to a square of the difference between an intensity collected at the fourth pixel and an intensity collected at the second pixel. This calculation is represented by the formula shown in FIG. 14 in connection with image 1402. In various embodiments, such as the one shown in FIG. 14, a threshold may be applied in connection with calculating the signal.

FIG. 10A shows an experimental image 1001 from a polarization PD-IRIS system, in accordance with aspects of inventive concepts.

FIG. 10B shows a magnified view of a region 1010 of the experimental image from FIG. 10A, showing a particle of interest appearing with a checkerboard pattern, in accordance with aspects of inventive concepts.

FIG. 10C shows a processed image 1002 based on information from the experimental image of FIG. 10A, in accordance with aspects of inventive concepts.

FIG. 10D shows a magnified view of a region 1020 of the processed image from FIG. 10C, showing a particle of interest as a bright spot, in accordance with aspects of inventive concepts. In this processed image 1002, background is suppressed, and the signal of interest is enhanced.

In polarization PD-IRIS, nanorods can be differentiated from the other particles, such as spherical particles, artifacts, etc. due to the distinct polarization response of the nanorods, as shown in FIGS. 11A-11D.

FIG. 11A shows an experimental image 1101 from a polarization PD-IRIS system, in accordance with aspects of inventive concepts. The target molecules are labelled with nanorods which anisotropicly scatters the incoming light. This property is used in polarization PD-IRIS and interpreted using a polarization camera such that only the particles with such anisotropic characteristics are enhanced in the signal image 1102 (see FIG. 11D).

FIG. 11B shows a magnified view of a gold nanospheres (GNS) from the experimental image 1101, shown in FIG. 11A.

FIG. 11C shows a magnified view a gold nanorod (GNR) from the experimental image 1101, shown in FIG. 11A. Because the gold nanorod anisotropicly scatters the incoming light, the image acquired with a polarization camera appears with a checkerboard pattern.

FIG. 11D shows a calculated signal image 1102 based on the information from the experimental image 1101 in FIG. 11A, in accordance with aspects of inventive concepts. FIG. 11D shows that gold nanorods present in the raw image 1101 are preserved in the calculated signal image 1102 while gold nanospheres are removed in the calculated signal image 1102.

The signal in PD-IRIS is defined by the variations between the adjacent pixels in the raw captured images of target nanoparticles. Thus, any sudden intensity changes in a raw image are likely to appear as false signals in the processed image. One major reason of those changes is due to the pixel-to-pixel variations of a given sensor. These variations are sensor dependent and must be calibrated for each sensor. In PD-IRIS, an image of evenly illuminated mirror sample is used as a look-up-table to correct for the pixel-to-pixel variations. With that technique, the signal-to-background ratio can be improved more than 6 times, as shown in FIG. 12.

FIG. 12A shows an example experimental image acquired with a PD-IRIS setup. FIG. 12B shows an image of an evenly illuminated mirror sample. FIG. 12C shows a processed image generated by using information from the image of FIG. 12A and the image of FIG. 12B. The top graph in FIG. 12D shows the amplitude corresponding to the dashed line through the particle in the image of FIG. 12A. The bottom graph in FIG. 12D shows the amplitude corresponding to the dashed line through the particle in the image of FIG. 12C. The signal corresponding to the line through the particle of the processed image has a larger signal to background ratio (SBR), about 58 (FIG. 12D, bottom), in comparison to the SBR or the signal corresponding to the line through the particle of the experimental image, about 7 (FIG. 12D, top). The systems, devices, and methods described in connection with FIGS. 12A-D may be used in any modality of PD-IRIS.

The captured images are post-processed to enhance the high-frequency, checkerboard patterns and to suppress the background. For polarization PD-IRIS, adjacent orthogonal pixel values are subtracted from each other for each pair then the squares of the results are added to construct the signals. For spectral PD-IRIS, the variation of different color channels defines the signal image. After calculating the variation, checkerboard patterns due to particles appears as brighter than background.

Figure 13A:
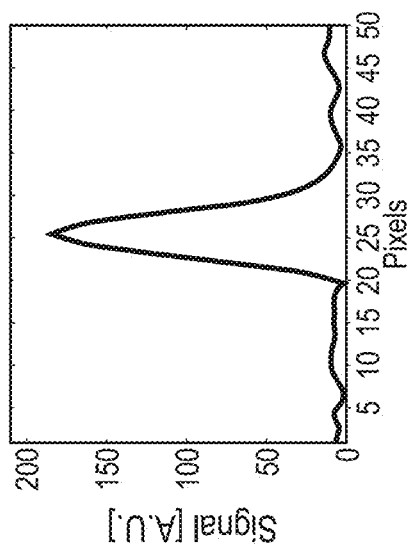
FIGS. 13A-13C shows example experimental images of conventional SP-IRIS and PD-IRIS methods and cross section plots of the particle signals, in accordance with aspects of inventive concepts.
Figure 13B:
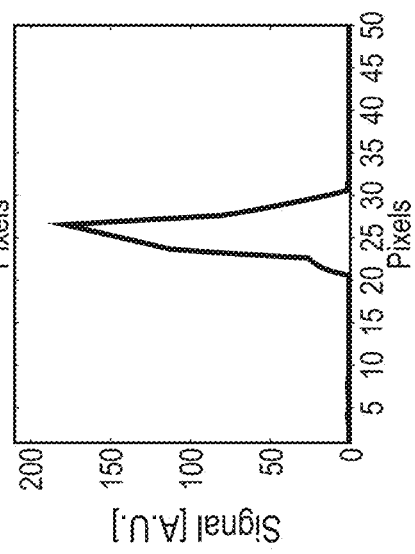
Figure 13C:
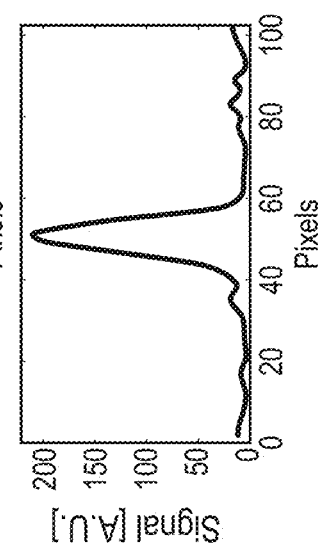

The comparison of SP-IRIS, polarization PD-IRIS, and spectral PD-IRIS is shown in FIGS. 13A-13C with experimental images, their corresponding processed images, and a sample line cut. A high quality signal can be achieved with single snapshot acquisition in PD-IRIS. In FIGS. 13A-13C, raw images of the same region of interest that include captured gold nanorods (GNR) are taken with conventional SP-IRIS (see FIG. 13A) and polarization PD-IRIS (see FIG. 13B). The particles are then detected within the processed images (middle column), with a similar signal-to-background ratio, shown in the rightmost column. A raw image of a region of interest containing captured particles is taken with the spectral PD-IRIS (FIG. 13C), and the particles are then detected from the processed image with a high signal-to-background ratio.

Computational neural networks (CNNs) can be trained for the particular target of interest to enhance the signal-to-background ratio in images. Typically, large data sets (hundreds of thousands of annotated training samples) are required for training CNNs. U-Net, on the other hand, is a fully convolutional network optimized specifically for biomedical image segmentation and it has shown to outperform sliding-window networks with fewer training samples (Ronneberger et al., 2015).

Figure 14:
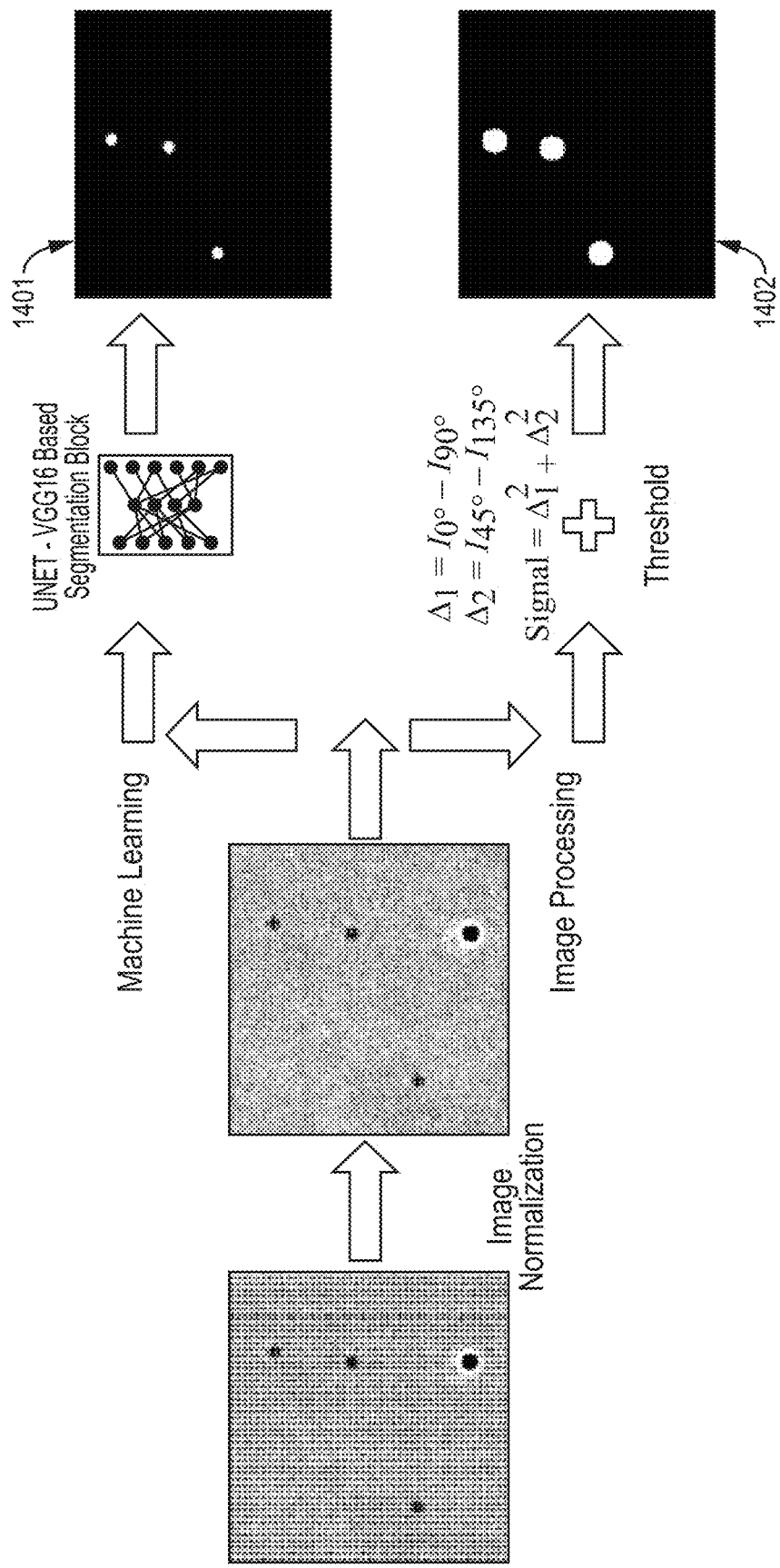
FIG. 14 shows an example image processing pipeline of PD-IRIS from image acquisition until particle segmentation, in accordance with aspects of inventive concepts.

The signal calculations can be done with different methods in PD-IRIS. FIG. 14 shows two different ways to calculate and segment the experimental images. The normalization with a sensor specific look-up-table (for example, as described in connection with FIG. 12) is common in those two methods. Afterwards, the particles in each image can be found and segmented using either a convolutional neural network or image processing algorithms. Two segmented images 1401 and 1402 are the result of the experimental image calculated with VGG16 Based U-Net segmentation block and image processing methods, respectively.

REFERENCE(S)

Ronneberger, O., Fischer, P., and Brox, T. (2015): U-Net: Convolutional Networks for Biomedical Image Segmentation. arXiv:1505.04597 [cs.CV]

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An interferometric reflectance imaging system for detection of nanoparticles comprising:
an imaging sensor comprising pixels that are configured to be diverse in sensitivity to a plurality of light components, the pixels including a first type of pixels configured to be sensitive to a first component of the plurality of light components, the pixels including a second type of pixels configured to be sensitive to a second component of the plurality of light components;
an illumination source configured to emit illumination light along an illumination path, the illumination light comprising the plurality of light components; and
a target comprising a target substrate configured to support one or more nanoparticles on a surface of the target substrate, the target configured to receive the illumination light from the illumination path and reflect light along a collection path toward the imaging sensor,
wherein the system is configured to:
generate an image at the imaging sensor based, at least in part, on the light reflected from the target interfering with light scattered from nanoparticles on the target substrate; and
process the image to detect the nanoparticles on the target substrate based, at least in part, on a variance between light collected by the first type of pixels and light collected by the second type of pixels.

2. The imaging system of claim 1, wherein the plurality of light components emitted by the illumination source are different spectra of light and the imaging sensor is a multi-spectral camera.

3. The imaging system of claim 2, wherein the illumination source includes two or more narrow-band light sources.

4. The imaging system of claim 3, wherein the narrow-band light sources are LED sources, each LED source emitting light at a different wavelength.

5. The imaging system of claim 2, wherein the different spectra of light are red, blue, and green in the visible spectrum and the imaging sensor is a color camera.

6. The imaging system of claim 1, wherein the nanoparticles are biological nanoparticles.

7. The imaging system of claim 6, wherein the nanoparticles include at least one of viruses, exosomes, or other macromolecules.

8. The imaging system of claim 1, wherein the nanoparticles include at least one of a gold nanosphere, a dielectric nanoparticle, or any other type of artificial nanoparticle.

9. The imaging system of claim 1, wherein the nanoparticles have dimensions in a range of about 10 to about 100 nanometers.

10. The imaging system of claim 1, wherein the plurality of light components of the illumination light emitted by the illumination source are different polarizations of light and the imaging sensor is a polarization camera.

11. The imaging system of claim 10, wherein the polarization camera comprises pixels nominally sensitive to 0, 45, 90, and 135 degrees of linearly polarized light.

12. The imaging system of claim 10, wherein the illumination source emits randomly polarized light.

13. The imaging system of claim 10, wherein the illumination source comprises an LED light source.

14. The imaging system of claim 10, wherein the nanoparticles are rod-shaped nanoparticles.

15. The imaging system of claim 14, wherein the rod-shape nanoparticles are gold nanorods.

16. The imaging system of claim 15, wherein the gold nanorods have dimensions in a range of about 10 to about 100 nanometers.

17. The imaging system of claim 14, wherein the illumination source is a narrow spectrum light source configured to emit light with characteristics matching the optical resonance of the rod-shaped nanoparticles.

18. The imaging system of claim 17, wherein the illumination source comprises an LED light source with an emission spectrum nominally matching the optical resonance of the gold nanorods on the surface of the target substrate.

19. The imaging system of claim 10, wherein the imaging sensor comprises at least one superpixel, each superpixel comprising:
a first pixel configured to be selectively sensitive to linearly polarized light along a first axis;
a second pixel configured to be selectively sensitive to linearly polarized light oriented 45 degrees relative to the first axis;
a third pixel configured to be selectively sensitive to linearly polarized light oriented 90 degrees relative to the first axis; and
a fourth pixel configured to be selectively sensitive to linearly polarized light oriented 135 degrees relative to the first axis.

20. The imaging system of claim 1, wherein the imaging sensor is configured to form at least one image and the imaging system further comprises a processor configured to analyze the at least one image from the imaging sensor.

21. The imaging system of claim 1,
wherein the target substrate includes a base substrate having a first reflecting surface and a transparent spacer layer having a first surface in contact with the first reflecting surface and a second reflecting surface on a side opposite to the first surface, and
wherein the transparent spacer layer has a predefined thickness that is determined as a function of a wavelength of the illuminating light and produces a predefined radiation pattern of optical scattering when nanoparticles are positioned on or near the second reflective surface.

22. The imaging system of claim 1, wherein each nanoparticle on the target substrate is capable of reflecting light with different characteristics for each one of the plurality of light components of the illumination light.

23. The imaging system of claim 1, wherein, at a nominal focus position, the system is configured to process the image to extract one or more optical properties of the nanoparticles on the target substrate.

24. A method for detection of nanoparticles, comprising:
providing a target comprising a target substrate and one or more nanoparticles on the surface of the target substrate;
illuminating the target substrate with a plurality of light components along an illumination path;
collecting light reflected and scattered from the target on an imaging sensor comprising pixels configured to be diverse in sensitivity to the plurality of light components, the pixels including a first type of pixels configured to be sensitive to a first component of the plurality of light components, the pixels including a second type of pixels configured to be sensitive to a second component of the plurality of light components;
generating an image at the imaging sensor based on interference of the light reflected and scattered from the target; and
processing the image to detect the nanoparticles on the target substrate based, at least in part, on a variance between light collected by the first type of pixels and light collected by the second type of pixels.

25. The method of claim 24, wherein the processing the image comprises calculating the variance for each pixel.

26. The method of claim 24, wherein the imaging sensor comprises at least one superpixel, each superpixel comprising:
a first pixel configured to be selectively sensitive to linearly polarized light along a first axis;
a second pixel configured to be selectively sensitive to linearly polarized light oriented 45 degrees relative to the first axis;
a third pixel configured to be selectively sensitive to linearly polarized light oriented 90 degrees relative to the first axis; and
a fourth pixel configured to be selectively sensitive to linearly polarized light oriented 135 degrees relative to the first axis.

27. The method of claim 26, wherein the processing the image comprises calculating a signal for each superpixel based on a square of the difference between an intensity collected at the third pixel and an intensity collected at the first pixel added to a square of the difference between an intensity collected at the fourth pixel and an intensity collected at the second pixel.

28. The method of claim 24, further comprising, at a nominal focus point, processing the image to extract one or more optical properties of the nanoparticles on the target substrate.

29. The method of claim 24, wherein the plurality of light components are different spectra of light, and the imaging sensor is a multi-spectral camera.

* * * * *